Dec. 23, 1941.  M. M. KINLEY ET AL  2,267,110
SURVEYING CALIPER
Filed July 18, 1940    2 Sheets-Sheet 1

Inventors.
MYRON M KINLEY
JAMES GUPTON

Lester B Clark.
ATTORNEY

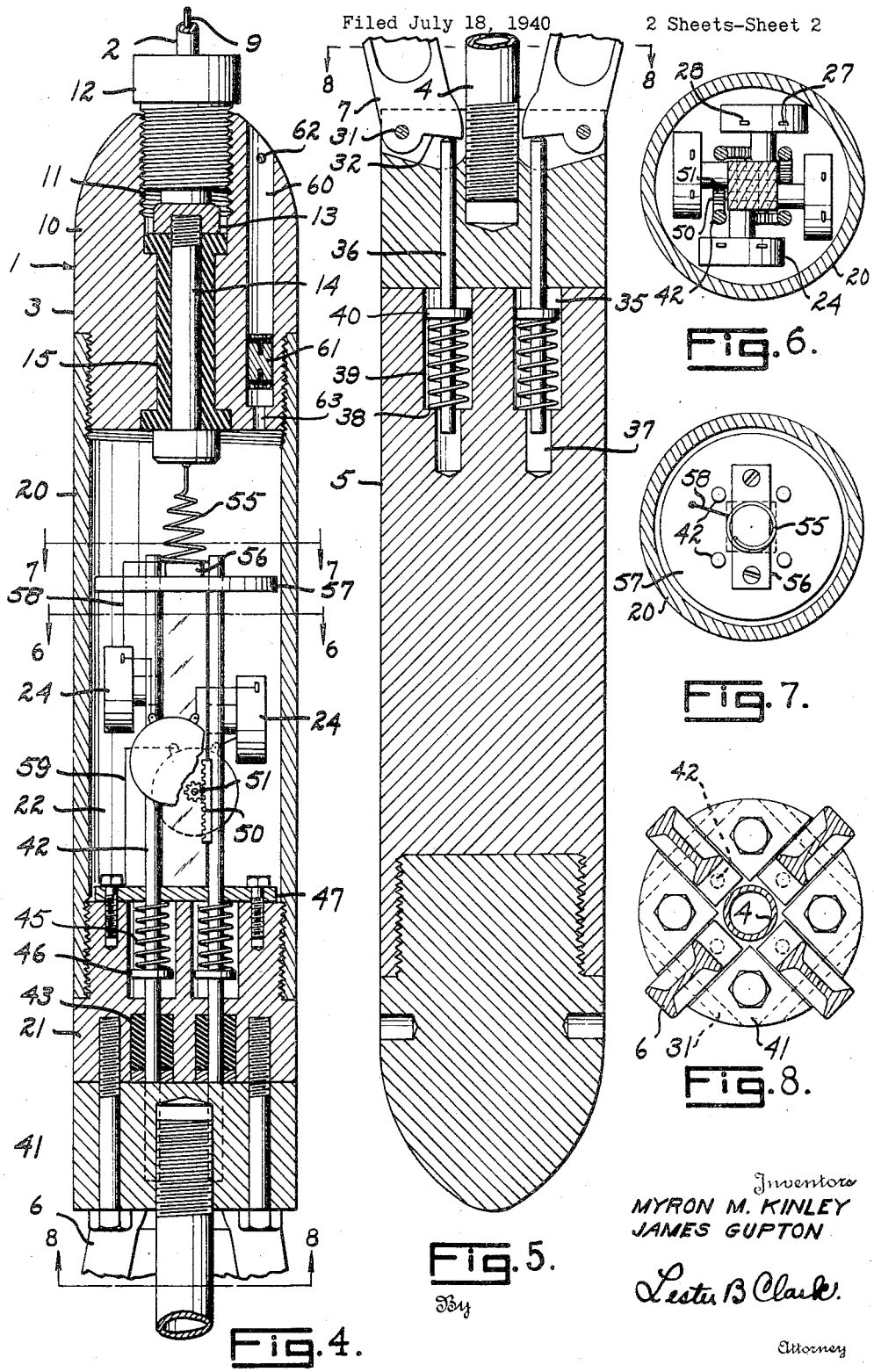

Patented Dec. 23, 1941

2,267,110

UNITED STATES PATENT OFFICE 2,267,110

SURVEYING CALIPER

Myron M. Kinley and James Gupton, Houston, Tex.; said Gupton assignor to said Kinley Application July 18, 1940, Serial No. 346,116

11 Claims. (Cl. 33—178)

This invention relates to a device adapted to be moved within a bore to determine the variations in the cross sections thereof as the device is made to traverse the bore and is of particular utility in surveying well bores for determining the cross sectional area at all levels therein.

The invention relates to and comprises an improvement in well surveying device of the general type disclosed in my prior Patent No. 2,102,080 issued December 14, 1937.

The primary object of the invention is to provide a novel device for determining the size and shape of a well or like bore.

Another object is to provide an instrument of the class described which is capable of exhibiting at the mouth of the bore a continuous indication of the diametric variations in the bore hole as the device is moved therein.

Still another object is to provide a device which will give a continuous indication of diametric variations in a bore hole as the device is lowered into or elevated within the bore hole.

Another object is to provide a device having a plurality of feeler or caliper arms which are constantly urged radially outward into engagement with the walls of the well bore, mechanism being provided for instantaneous indications of the positions of such arms.

Another object is to provide a device which is lowerable upon a conductor cable and including an electric circuit within which the electrical conditions vary with and are indicative of the variations in the dimensions of the well bore.

Still another object is to provide a device including an electric circuit having variable resistors which vary with the movement of the caliper arms and hence give rise to variations in electrical conditions in such circuit, such variations being a measure of the diametric variations of the bore hole.

The foregoing objects together with other objects will be apparent from the following description taken in connection with the accompanying drawings in which:

Figs. 4 and 5 are vertical sectional views of successive portions of the device;

Fig. 6 is a transverse section taken on line 6—6 in Fig. 4;

Fig. 7 is a transverse section taken on line 7—7 in Fig. 4;

Fig. 8 is a sectional view taken on line 8—8 in Fig. 4;

Figures 1, 2, 3, 9:
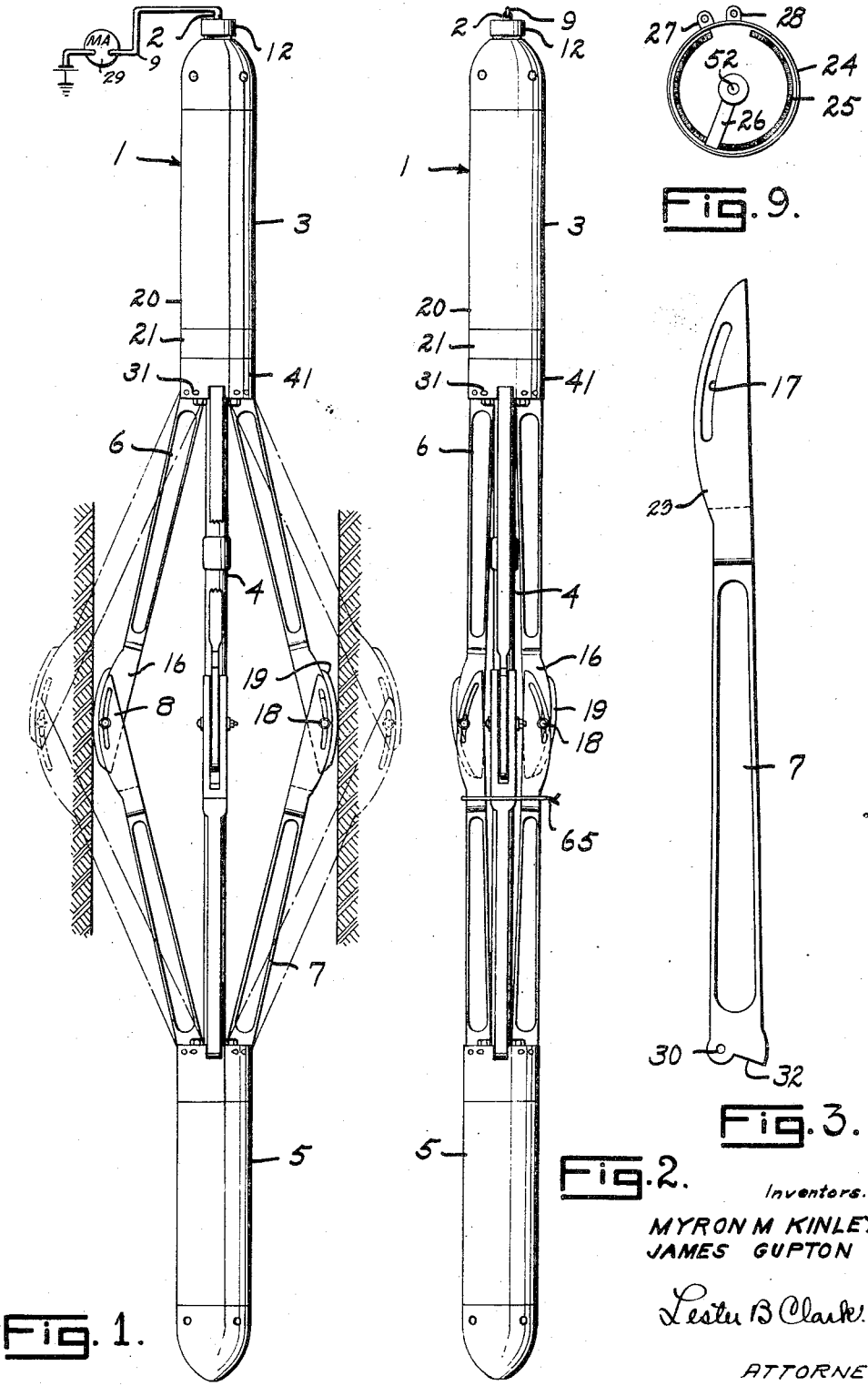
Fig. 1 is an elevational view of a device embodying the invention and showing the relative position of parts when the device is within a bore hole.
Fig. 2 is an elevational view of the device with the caliper arms held inwardly so that the device may be readily transported.
Fig. 3 is an elevational view of one of the caliper arms.
Fig. 9 is a detail showing one of the resistors constituting an element of the device.

The device is generally referred to in the drawings as an assembly 1 which comprises a conductor cable 2 attached to the head 3 which is in turn attached by means of a rod 4 to a body member 5 at the lower end of the assembly. A plurality of pairs of feeler or caliper arms are attached to the head 3 and the body 5 and each of said pairs comprises an upper arm 6 and a lower arm 7 which are interconnected at their inner ends by a loose connection generally referred to as 8.

As best seen in Fig. 4 the head 3 comprises a plug member 10 which is provided with a threaded bore 11 at its upper end to receive the connector 12 in which the conductor cable 2 terminates in such manner that the conductor 9 in the cable is electrically connected to the cap 13 attached to stem 14 passing through the insulator 15 extending downwardly from the bore 11. This construction provides a mechanical connection between the cable 2 and the assembly 1 and also provides a fluid tight seal within the plug 10.

A nipple 20 is threadably attached to the plug 10 and to a collar 21 to form a chamber 22 therebetween to receive a plurality of variable resistors 24 which are best shown in Fig. 9 and which comprise an annularly arranged resistance wire 25 over which a sliding contact 26 is movable so that the resistance between the terminals 27 and 28 may be varied to serve a function that will be more fully apparent.

Since the pairs of feeler arms are identical reference will be made to a single pair of these arms of which the upper and lower members 6 and 7 are provided at their outer ends with an opening 30 to receive a pin 31 so that the arms are pivotally attached to the head and body members respectively. Adjacent the opening 30 in the arms there is provided a radially extending end surface 32 which is engaged by a spring pressed plunger within the head 3 on the body 5 to constantly urge the arms outwardly so that the inner ends of the arms will be pressed against the walls of the well bore as indicated in Fig. 1.

The inner end of the arm 7 is provided with bifurcations 23 to receive the flat inner end 16 of the arm 6. The bifurcations 23 and the end 16 of the arms are provided with slots 17 through which a pin 18 passes to provide the loose connection 8 between the arms 6 and 7. The arcuate outer surface of the end 16 is provided with a shoe 19 which is preferably of a wear resistant material so that the sliding contact of this portion of the arms with the wall of the well bore will not be rapidly abraded. It is to be noted that this arcuate construction, particularly in cooperation with the adjacent surface on the arms 6 and 7, enables movement of the assembly 1 either upwardly or downwardly within the bore hole and it is intended that the device when in use may be moved in either direction and observations may be made, as hereinafter set forth, regardless of the direction of the movement of the device.

The upper end of the body 5 is provided with bores 35 into which the lower end of plungers 36 extend. These bores are reduced in cross section at 37 to form a shoulder 38 upon which spring 39 rests. The opposite end of the spring engages a flange 40 on the plunger 36 so that the plunger is constantly urged upwardly in engagement with the surface 31 on the lower arm 7.

The upper end of the arm 6 is similarly attached to the block 41 at the lower end of the collar 21. However the upper plungers 42 pass through a packing 43 in the collar 21, such packing being provided to exclude the entrance to the chamber 22 along the plunger 42.

The spring 45 surrounding the plunger 42 engages the flange 46 on the plunger and also engages a guide plate 47 through which the plunger passes.

Above the plate 47 each of the plungers 42 is provided with a plurality of teeth 50 which mesh with a pinion 51 mounted upon the shaft 52 to which the contact arm 26 of the variable resistor 24 is attached. It seems apparent that by means of this construction the position of the contact arm 26 upon each of the resistors will depend upon the position of the associated pair of feeler arms.

In order to obtain the desired indication of the positions of the feeler arms a grounded electric circuit is provided so that the assembly 1 and the earth act as a conductor leading to the mouth of the bore hole. The other conductor for the circuit is shown as 9 in the conductor cable 2 and extends from the stem 14 through the spring 55 which is attached to an insulator block 56 mounted upon a guiding disk 57 through which the plungers 42 pass. The spring 55 is attached by means of a conductor 58 to one of the resistors 24, all of such resistors being connected in series and the last in the series being connected by means of conductor 59 to the body of the assembly.

While it has just been pointed out that the resistors 24 are preferably connected in series it is to be understood that other suitable connections of such resistors may be relied upon. It is also to be understood that the electric circuit also includes suitable mechanisms at the mouth of the bore hole, as for example a milliammeter 29, so that desirable indications in the circuit may be had as the device is made to traverse the bore hole. It is understood that any of suitable mechanisms available on the market for indicating the variations in electrical conditions in the electric circuit just described may be utilized. For example, known means may be used for constantly measuring the resistance of said such circuit, the drop of potential across the circuit, or the variations of current within the circuit when a constant potential is maintained thereon. Obviously other electrical characteristics of the circuit may be observed if desired. Electrical apparatus suitable for measuring electrical characteristics of the circuit is disclosed in the copending application of Finley T. Robidoux, Serial No. 419,215, filed November 14, 1941.

The plug 10 is provided with a longitudinal bore 60 within which is provided a piston 61 having sealing engagement with the walls of the bore and movable between the lower end of the bore and a retaining pin 62 at the upper end thereof. A passage 63 connects the bore 60 with the chamber 22, such chamber being filled with a suitable insulating liquid so that the entrance of well fluids to the interior of the chamber 22 and the mechanisms therein is effectively avoided. The volume of the chamber 22 varies slightly with the movements of the plungers 42 and the piston 61 moves in a manner to compensate for such variations in the volume of the chamber.

The operation of the device above described is believed apparent from the description. By way of summary it may be pointed out that during transportation of the device the pairs of arms are held inwardly as by means of a binding member shown as a wire 65 in Fig. 2. This wire is released preliminary to the lowering of the assembly 1 within the well bore. When the indicating instruments at the mouth of the well bore are properly adjusted the assembly is then lowered within the bore and the caliper arms are urged outwardly as disclosed so that the wear resistant shoes 19 on the upper arms 6 slidably engage the walls of the well bore. Observations are made or a record is produced of conditions in the electric circuit as the device is either lowered or raised within the well bore and in this manner it is possible to determine the diametric variations in the well bore whereby the object of the invention is realized. Broadly the invention comprehends a simple and novel construction for determining the size and shape of a well or like bore throughout the length thereof.

What is claimed is:

1. In a well surveying device for measuring the diametric variations in a bore hole the combination of a conductor cable, an assembly attached to said cable to be lowered into a well bore, said assembly comprising a head member attached to said cable and having a chamber therein, a body member in spaced relation with the head member, a plurality of pairs of interconnected arms having their outer ends pivotally attached to the head and body members respectively, a variable resistor mounted in said chamber for each of said pairs of arms, means operable by each of said pairs of arms for varying the resistance of one of the resistors, and an electric circuit including the resistors, a conductor in said cable and indicating means attached to the conductor at the mouth of the bore hole whereby the positions of the arms may be observed by the variations in electrical conditions in such circuit.

2. In a well sureying device for measuring the diametric variations in a bore hole the combination of a conductor cable, an assembly attached to said cable to be lowered into a well bore, said assembly comprising a head member attached to said cable and having a chamber therein, a body member in spaced relation with the head member, a plurality of pairs of interconnected arms having their outer ends pivotally attached to the head and body members respectively, a variable resistor mounted in said chamber for each of said pairs of arms, operable by each of said pairs of arms for varying the resistance of one of the resistors, and an electric circuit including the resistors, a conductor in said cable and indicating means attached to the conductor at the mouth of the bore hole whereby the positions of the arms may be observed by the variations in electrical conditions in such circuit, said chamber being filled with an insulating fluid to exclude well fluids from the chamber.

3. In a well surveying device for measuring the diametric variations in a bore hole the combination of a conductor cable, an assembly attached to said cable to be lowered into a well bore, said assembly comprising a head member attached to said cable and having a chamber therein, a body member in spaced relation with the head member, a plurality of pairs of interconnected arms having their outer ends pivotally attached to the head and body members respectively, a variable resistor mounted in said chamber for each of said pairs of arms, means operable by each of said pairs of arms for varying the resistance of one of the resistors, an electric circuit including the resistors, a conductor in said cable and indicating means attached to the conductor at the mouth of the bore hole whereby the positions of the arms may be observed by the variations in electrical conditions in such circuit, said chamber being filled with an insulating fluid to exclude well fluids from the chamber, a bore in said head communicating with the chamber therein, and a piston movable in said bore to compensate for variations in volume of the chamber.

4. In a well surveying device for measuring the diametric variations in a bore hole the combination of an assembly adapted to be lowered into a well bore, said assembly including spaced head and body members, there being a chamber in one of the members, a plurality of pairs of interconnected arms having their outer ends pivotally attached to the head and body members respectively, a plurality of variable resistors mounted in said chamber, means operable by each of said pairs of arms for varying one of said resistors, indicating means at the mouth of the bore hole, a conductor connected to said indicating means and extending downwardly in the well bore to said assembly, and an electric circuit including said resistors in series, said indicating means and conductor so that the variations in electrical conditons in said circuit by the movements of all of said arms is indicative of the diametric variations of the bore hole.

5. In a well surveying device the combination of a head member having a chamber therein, a body member, means attached to and holding said members in fixed spaced relation, paired arms pivotally attached to said members and having a slidable connection at the inner ends of each pair, spring pressed plungers mounted in said members and engaging and urging said arms radially of the members, and means operable by the movements of the plungers in the head member for indicating the movements of the arms.

6. In a well surveying device, a head member having a chamber therein, caliper arms pivotally attached thereto, means extending sealably outwardly from within the chamber and adapted to move in accordance with the movements of said arms, a liquid within said chamber, and means movable by said liquid to compensate for volumetric changes produced by the movements of said first mentioned means.

7. In a well surveying device the combination of a head member having a chamber therein and a body member secured in fixed spaced relation therewith, a plurality of pairs of arms having their outer ends pivotally attached to the head and body members respectively, a slidable connection between the inner ends of the arms of each pair, spring pressed plungers sealably passing through the wall of said chamber and engaging and urging the arms outwardly into engagement with the walls of a surrounding bore, a liquid within said chamber, a bore in said head communicating with the chamber therein, a piston movable in said bore whereby the liquid is retained within the chamber and the volume of the chamber is compensated for movement of the plungers, and means operable by the movements of the plungers for indicating the movements of the arms.

8. In a well surveying device, an elongated head member having a chamber therein and adapted to be lowered into a well bore, spring pressed members extending outwardly from within the head member, means movable by said spring pressed members into engagement with the walls of the well bore, a liquid filling said chamber to exclude well liquids from within the chamber, and movable means in contact with said liquid and the liquid within the well bore for maintaining a constant volume within the head member.

9. In a well surveying device, an elongated head member having a chamber therein and adapted to be lowered within a well bore, spring pressed members extending outwardly from within said member, means for moving said members in accordance with the diametrical variations in the bore hole, a liquid filling the chamber within the head member, a passage between the interior and exterior of the head member, and a piston movable in said passage, whereby the volume of the chamber is maintained constant and well liquids are excluded therefrom.

10. In a device of the class described an elongated body member, a chamber therein, there being passages between the interior and exterior of the member, said passages being counterbored at their inner and outer ends, a movable plunger in each of said passages, packing in each of the outer counterbores sealably surrounding the plunger therein, an abutment on each plunger in the inner counterbore and a spring in engagement with said abutment to normally urge the plunger outwardly.

11. In a device of the class described an elongated body member, a chamber therein, there being passages betwen the interior and exterior of the member, said passages being counterbored at their inner and outer ends, a movable plunger in each of said passages, packing in each of the outer counterbores sealably surrounding the plunger therein, an abutment on each plunger in the inner counterbore, a fixed guide plate for the plungers at the inner end of the passages, and a spring surrounding each plunger and engaging said guide plate and the abutment on the associated plunger to normally urge the plunger outwardly.

MYRON M. KINLEY.
JAMES GUPTON.